United States Patent [19]

Gics

[11] 4,031,012
[45] June 21, 1977

[54] SEPARATORY APPARATUS

[75] Inventor: Paul W. Gics, Santa Ana, Calif.

[73] Assignee: Gics Pharmaceuticals, Inc., Santa Ana, Calif.

[22] Filed: Sept. 17, 1975

[21] Appl. No.: 614,268

[52] U.S. Cl. .............................. 210/321 A; 55/158; 210/321 B

[51] Int. Cl.$^2$ ......................................... B01D 13/00

[58] Field of Search ....... 210/321 A, 321 B, 321 R, 210/321 C, 497.1, 500 M; 55/16, 158

[56] References Cited

UNITED STATES PATENTS

| | | | |
|---|---|---|---|
| 3,691,068 | 9/1972 | Cross | 210/321 B |
| 3,708,071 | 1/1973 | Growley | 210/321 B |
| 3,870,637 | 3/1975 | Miyoshi et al. | 210/321 R |
| 3,884,814 | 5/1975 | Vogt et al. | 210/321 R |

*Primary Examiner*—Frank A. Spear, Jr.
*Assistant Examiner*—E. Rollins Cross
*Attorney, Agent, or Firm*—Christie, Parker & Hale

[57] ABSTRACT

A separatory apparatus comprises a card shaped core, flexible core extenders, hollow capillary fibers wound around the core and bonded to the core extenders, and a sealing flange having about the same rigidity and about the same density as the material from which the core extenders are fabricated. The apparatus has a casing with fluid distribution channels for the fluid flowing external to the capillaries. A hermetic seal is established by a sealing flange at each end of the casing and an O-ring at each end which is compressed while simultaneously ultrasonically welding headers to the open end of the casing. Only one header is used where the fibers wrap around one end of the core and the top fibers are separated from the bottom fibers at the other end of the core.

31 Claims, 10 Drawing Figures

SEPARATORY APPARATUS

BACKGROUND OF THE INVENTION

A number of designs for mass transfer devices and separatory apparatuses using small capillary tubing made of semi-permeable membrane and methods for making the same are known. Among these designs and methods are those described in U.S. Pat. Nos. 2,972,349, 3,228,876, 3,228,877, 3,339,341, 3,422,008, 3,455,460, 3,475,331, 3,536,611, 3,579,810, 3,961,068, 3,704,223, 3,794,468, 3,883,024, and 4,881,813.

These mass transfer devices typically comprise a plurality of hollow capillay fibers made of semi-permeable membrane in a housing with appropriate inlet and outlet passages. The fibers generally extend from end to end within the housing. The exteriors of the fibers are encapsulated at opposite ends of the core by spaced bands of a rigid potting compound. The fibers have open ends so that fluid can be passed through them. The core is placed in a housing made of a casing and two end caps. Sealing means are provided so that a first fluid can flow through an opening in one end cap, through the fibers, and out the opposite end cap, while at the same time a second fluid can flow around the exterior of the fibers through openings in the casing.

One method of manufacturing these devices comprises attaching bundles of fibers to the potting compound. Another method involves wrapping a single fiber around a cylindrical core and then encapsulating the fiber with the potting compound at the opposite ends of the core. The ends of the fibers are then exposed by cuttng through the fibers and the potting material in a plane perpendicular to the axis of the core.

Although the above-described methods produce a useful separatory apparatus of the kind described above, they are not without disadvantages.

Chief among these disadvantages is lack of uniformity from unit to unit. Most of these units are essentially hand made. One unit, for example, is made up by taking a plurality of parallel fibers in a bundle with an outside diameter approximating the inside diameter of the housing and inserting the bundle in the housing. However, the fibers may be squeezed and twisted thereby causing distortion in the inside diameter of the fibers.

Another problem with many of these devices is that they are bulky due to the use of a large, cylindrical core. Large bulk tends to increase the cost of the device. Also those devices using cylindrical cores have a long spiral flow path which gives rise to high pressure drop and increased chance of plugging of the fibers.

Another disadvantage of existing devices is that spacing and density of the capillary fibers during assembly often is not closely controlled. This tends to increase the bulk of the device and give non-uniform flow through the fibers, with resultant poor mass transfer.

Another problem with many of the devices is that there is no means for directing the flow of the fluid flowing external to the fibers. Therefore channelling and dead spaces where no mass transfer occurs can result.

Another disadvantage of these devices is the means used for preventing the fluid inside the fibers from mixing with the fluid outside of the fibers. Typically a rigid potting compound is used to encapsulate the fibers in conjunction with an unsupported O-ring to provide a seal. However, the rigid sealing material tends to permanently deform when under pressure, thereby causing leaks.

Typically the end caps are either solvent or adhesive bonded to the casing. Although these methods provide a seal, it is a time consuming and expensive process because when solvent is used it must be allowed to completely dry, and when adhesive is used it must be allowed to cure. Furthermore, since pressure from the end cap typically is used to compress an O-ring, the caps must be held against the casing while the solvent is drying or the adhesive is curing. Another method of attaching end caps is by screw threads. However, there is a tendency for the threaded headers or end caps to back off with time and leaks develop.

Therefore, it is desirable to produce a compact mass transfer device which has a multiplicity of uniform fibers, has no dead spaces, has no fluid flow channelling, does not leak, and is inexpensive to manufacture.

SUMMARY OF THE INVENTION

Therefore there is provided in accordance with this invention a mass transfer device comprising a separatory apparatus having at least one layer of selectively permeable, continuous, hollow fibers extending end to end on a card-shaped supporting core. There are core extenders that are permanently attached to each end of the core for ease of construction and as an aid in preventing crimped fiber ends. At least the terminal portions of the fibers are attached to the core extenders with a flexible or non-rigid potting compound. The core extenders are fabricated from a material with about the same rigidity and about the same density as the potting compound. Preferably the same material is used for the potting compound and for the core extenders.

The core with fibers is placed inside of a casing with fluid passages positioned on the sides of the casing for the fluid that flows externally to the fibers. In the preferred embodiment there is a circumferential flow distribution channel along the interior wall of the casing beneath at least one of the fluid passages on the side of the casing.

The means for separating the fluid flowing inside of the fibers from fluid flowing outside of the fibers comprises a sealing ring with a sealing flange and a flexible O-ring positioned on the end of the sealing flange which is circumferentially contiguous to the interior wall above a support projection of the casing. The sealing flanges are formed by extending the potting compound perpendicular to the core until it extends circumferentially beyond the interior of the casing.

In one embodiment of this invention the fibers terminate at opposite ends on the same side of the supporting core, and in another embodiment of the invention the fibers terminate at the same end but on opposite sides of the core.

A preferred method of assembling the separatory apparatus of this invention comprises attaching the core extenders to the core and then uniformly winding at least one strand of the capillary fiber around the core between the core extenders. Then the fiber wound core is inserted into a casing and the fibers are permanently bonded to the core extenders with the flexible potting compound. Sufficient potting compound is attached to the core extenders to form the sealing flanges which extend perpendicular to the core to circumferentially seal against an extension of an interior wall of the casing. The sealing ring (potting compound), fibers and core extender at each end are then cut perpendicular to the axis of the core to expose a plurality of fiber ends having openings communicating with the interior of the fibers. A hermetic seal is achieved by placing O-rings at both ends of the core on the periphery of the cut end of the potting compound about each core extender above a support projection of the casing and simultaneously ultrasonically welding a header to each open end of the casing so that the headers compress the O-rings.

DRAWINGS

These and other features and advantages of the present invention will be appreciated as the same becomes better understood by reference to the following detailed description of the presently preferred embodiment wherein.

BRIEF DESCRIPTION OF THE PREFERRED EMBODIMENT

Figure 1:
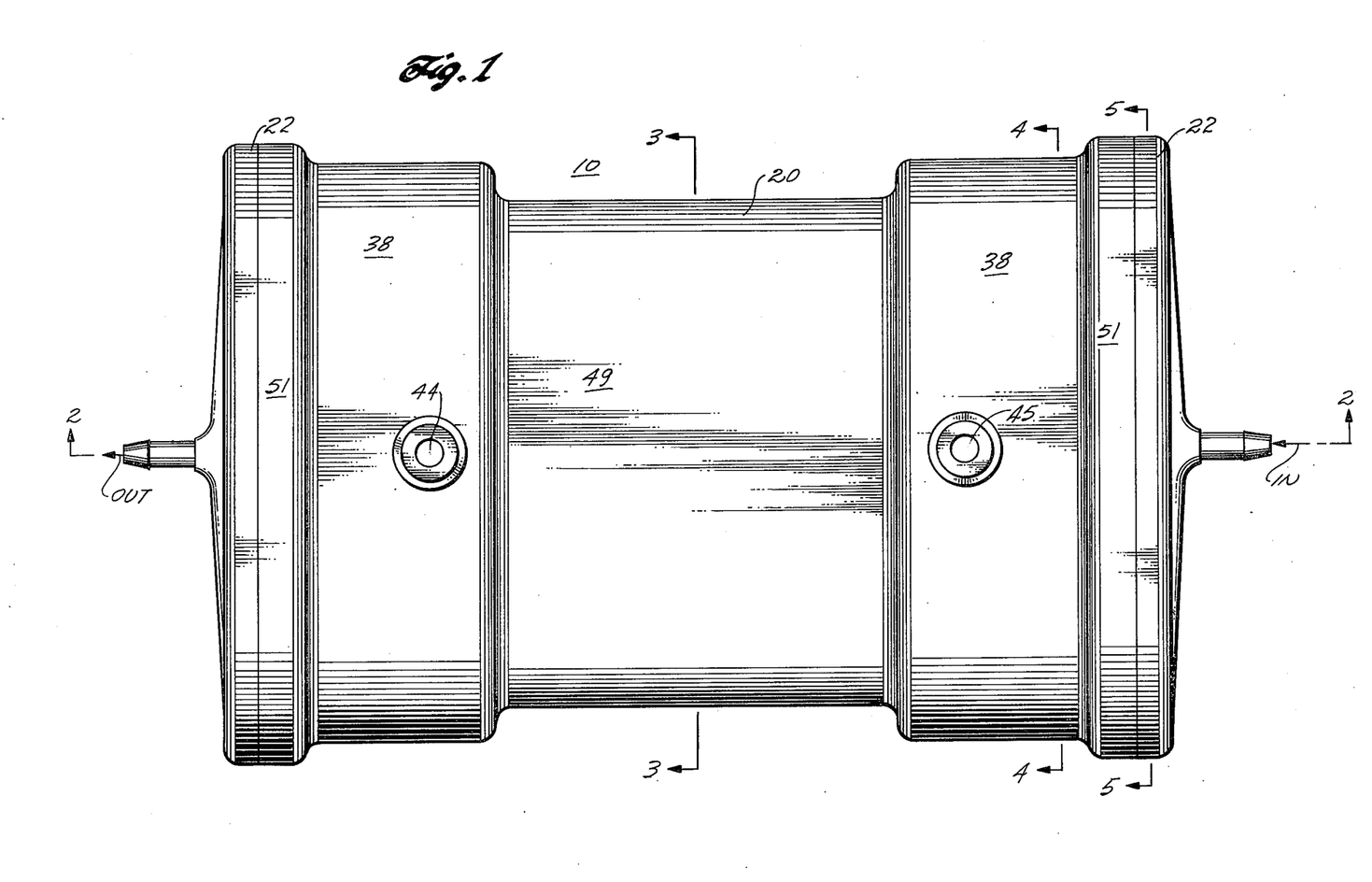
FIG. 1 is a top plan view of a separatory apparatus in accordance with this invention.

Referring to FIG. 1, there is shown a top plan view of an assembled separatory apparatus 10 in accordance with this invention. The apparatus comprises a casing or housing 20 and casing headers or end caps 22. The internal construction of the apparatus is shown in detail in FIGS. 2 through 6. In these figures, there is shown a core 12 having a core extender 14 attached at one end and a core extender 15 attached at the opposite end with capillary fibers 16 positioned on the core. The core 12 is thin, rectangular in cross-section and has a smooth surface. The advantages of this card-shaped core 12 is that it has maximum surface area with minimum buld. A separatory apparatus utilizing a card-shaped core is compact and also inexpensive to manufacture. The core extenders 14 and 15 are attached to a tongue at each end of the core which tongue has holes 17 therein for facilitating the mechanical coupling between the core 12 and the extenders 14 and 15.

Figure 2:
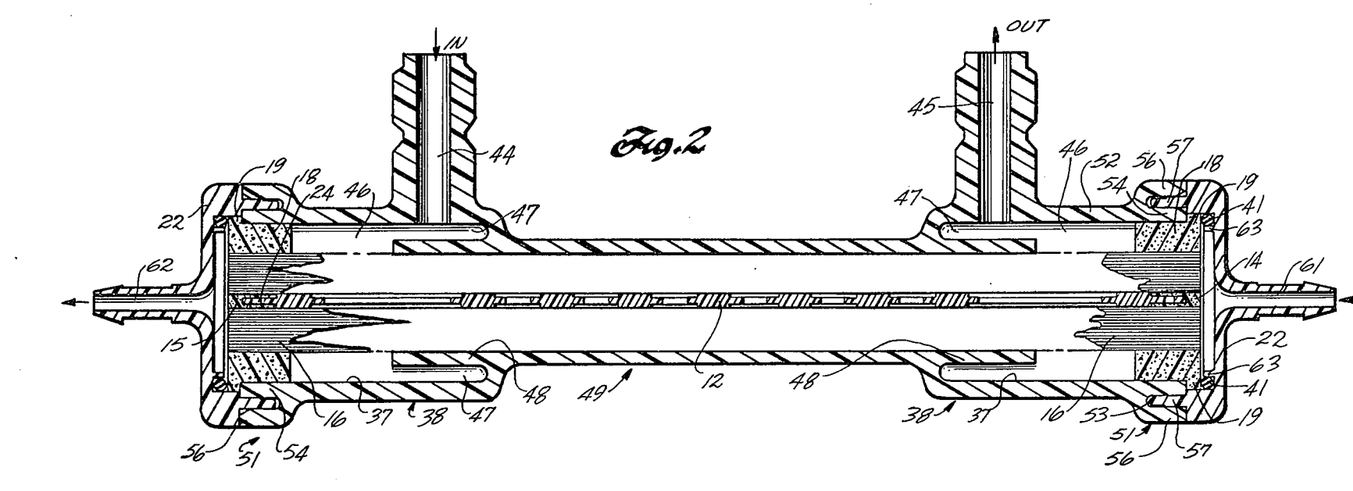
FIG. 2 is a cross-sectional side view taken along the center line 2—2 of FIG. 1.
Figure 3:
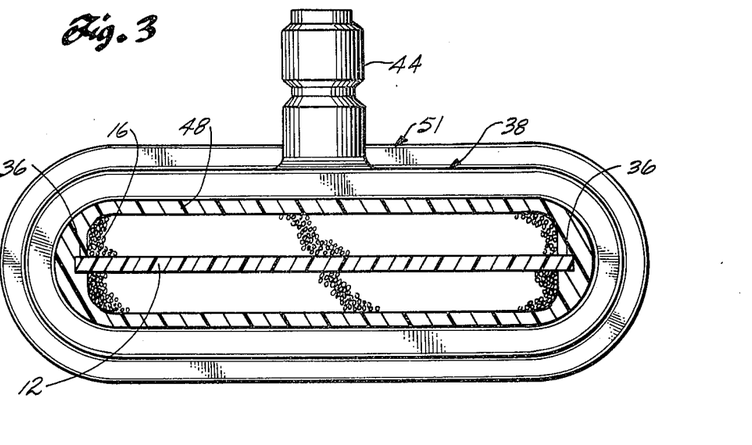
FIG. 3 is a cross-sectional view perpendicular to the longitudinal axis of the apparatus taken along lines 3—3 of FIG. 1.
Figure 4:
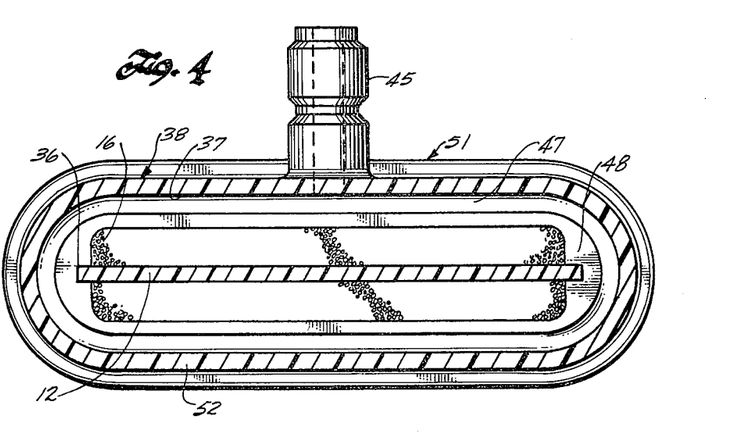
FIG. 4 is a cross-sectional view perpendicular to the longitudinal axis of the apparatus taken along lines 4—4 of FIG. 1.
Figure 6:
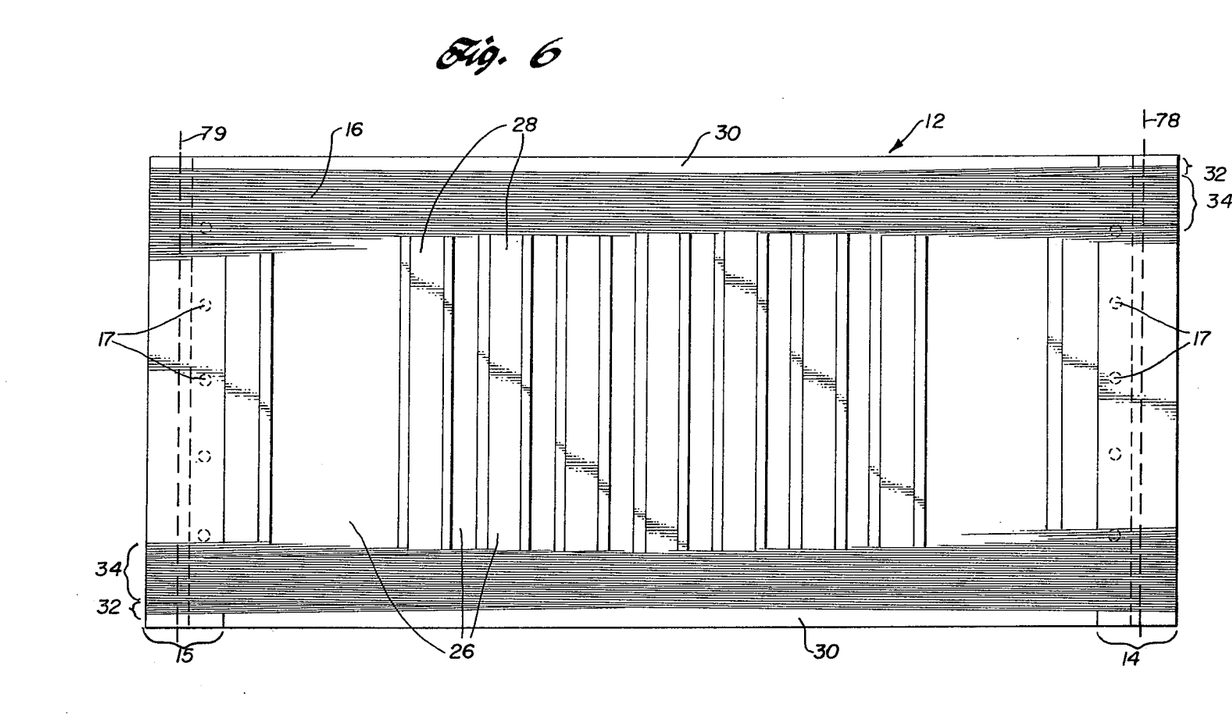
FIG. 6 is a top plan view of the core of the apparatus of the invention with a few fibers wound thereon in accordance with this invention.

The core is preferably perforated although it may be solid. The core 12 as shown in FIGS. 2 and 6 has a plurality of rectangular openings 26 extending between the sides of the core perpendicular to the axis of the fibers. Most of the surface area of the core is removed by removing sections to produce holes or openings 26 therein and; cross ribs 28 and sides 30 with the ribs 28 and sides 30 providing structural integrity for the core. This use of large perforations increases exposure of the fibers to fluid flowing exterior to the fibers and allows cross flow through the core. In addition, the use of large perforated areas decreases the weight of and amount of material used for the apparatus, thereby reducing manufacturing costs. Other shapes of perforations can be used. The size and positioning of the perforations of the core are determined according to the particular flow conditions desired.

While reference has been made to perforated cores, it is also possible to use in the practice of this invention non-perforated cores or porous cores made from a material such as porous ceramic. What is required is that the core be inert to the fluids used in the separatory apparatus, and in the case of biological fluids, be non-toxic. The material of choice for the core is polycarbonate since polycarbonate is readily available, inexpensive, easy to mold and machine, and has high strength.

The core 12 of FIGS. 2–6 has core extenders 14 and 15 attached to the tongue extensions 24 at the opposite ends of the core. The core extenders 14 and 15 serve to lengthen the core and provide a surface to which the fibers may be permanently bonded. The core extenders 14 and 15 preferably are about as thick as the core. The core extenders can be preformed and then bonded with solvent or adhesive to the core. However, the preferred method of attaching the core extenders to the core is by overmolding the core with the core extenders, thereby forming and attaching the core extenders in one step.

The material used for the core extenders must be inert, non-toxic when the device is used for biological applications, and be able to be bonded to the core. In the case of a polycarbonate core, epoxies and polyurethanes are satisfactory for the core extender.

On the surface of the core and core extenders there is a plurality of selectively permeable, continuously hollow capillary fibers or tubules 16. A multiplicity of individual fibers of length approximately equal to the length of the core and core extenders may be attached to the core.

However, it is preferred that one or more single strands of continuously hollow capillary fiber be uniformly wound around the core and core extenders. Using such a method results in a uniform configuration of contiguous, aligned fibers, on both sides of the cores as shown in FIGS. 2–6. A single continuous fiber may be wound on the core 12 by using an electrical coil winding machine such as that made by the Coil Winding Equipment Corporation of Oyster Bay, N. Y. An electrical coil winding machine turns the core while shuttling the fiber strand back and forth across the core surface.

Figure 7:
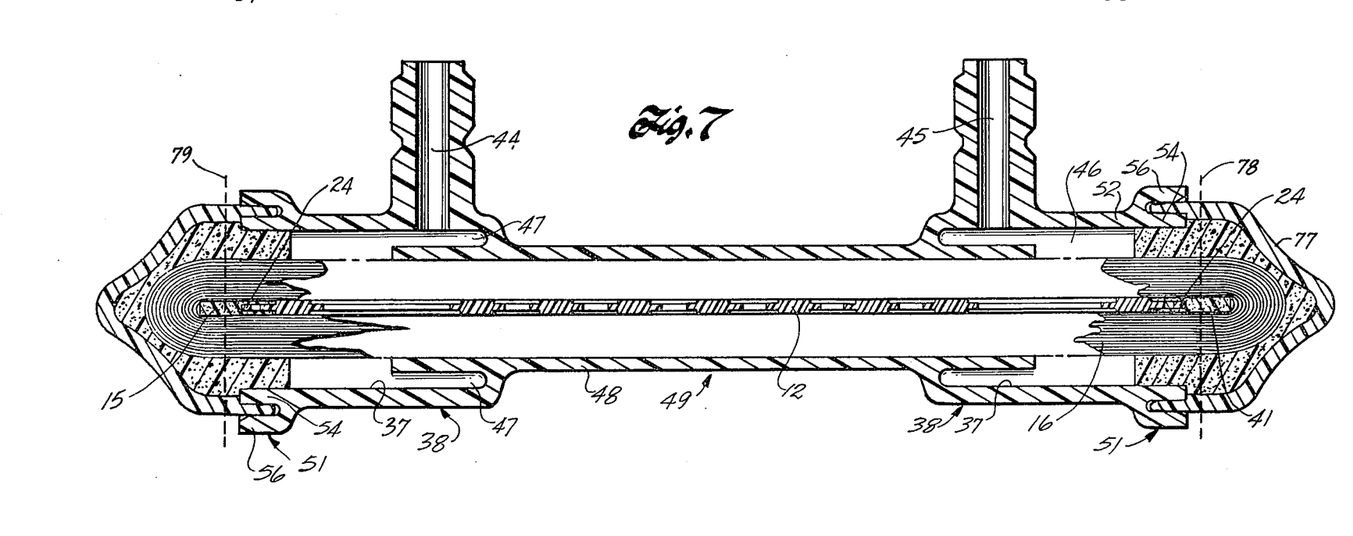
FIG. 7 is a cross-sectional view similar to FIG. 2 depicting the apparatus during assembly.

A coil winding apparatus applies the fibers in layers. As shown in FIGS. 6 and 7, a bottom layer 32 comprises a series of contiguous, uniformly aligned individual strands formed from one continuous fiber. The strands may be parallel to the sides of the core, or may be pitched in relation to the sides of the core. As shown in FIG. 6, it is preferred that the fibers be pitched at an angle of about 5°, although the angle can be from 0° to about 30°. Additionally, a combination of angles may be employed, for example, one angle may be used to the mid-point along the length of the device and the angle then reversed to give a pi winding or zigzag winding.

Above this first layer 32 there is a second layer 34 which also is pitched in relation to the side of the core, thereby giving a criss-cross configuration of the layers. The advantage of the criss-cross and zigzag configuration is that there is no channelling and areas of stagnation of fluid in the region external to the fibers are avoided. This results in improved mass transfer. Also the uniform configuration in the criss-cross and zigzag minimizes the amount of surface area of the fibers which are covered by the fibers above and below each fiber, thereby increasing the surface area available for mass transfer. Additionally, the winding of the fiber on the core results in minimum distortion of the diameter of the fiber to provide a substantially uniform diameter from end to end of each strand to enhance the flow of the fluid therethrough. This is particularly important where the fluid flowing through the fibers is blood as would be the case where the apparatus is employed as an artificial kidney to minimize the chances of clotting of the blood. Furthermore, the fact that the fibers are uniformly aligned without adjacent fibers constricting each other results in low pressure drop for the fluid flowing inside the fibers.

Although FIG. 6 shows only two layers of fibers, theoretically there is no limit to the number of layers which may be used. As the number of layers is increased, the surface area available for mass transfer increases. However, as the number of layers increases the amount of fluid flowing outside of the fibers which penetrates to the innnermost layers decreases and the bulk of the apparatus increases. Typically there are from 1 to about 1,000 layers on each side of the core and preferably about 20 layers. It is possible to have as many as 1,000,000 fibers on top of a six inch wide core.

In one particular separatory apparatus designed to function as an artificial kidney, the core has a width of four inches on which the fibers are wound and a length of approximately eight inches. The space for the fibers on each side of the core 12 as shown in FIGS. 2 through 5 is approximately one-half inch high. With these dimensions an effective and efficient hemodialyzer for an artificial kidney has approximately 4,000 strands on each side of the core.

Preferably the fibers do not cover the outer rib 30 of the core. This allows the core to be slipped into a slot 36 (FIGS. 3 and 4) in the casing 20 where the slot supports the core.

Various materials can be used for making the permeable continuous hollow fiber suitable for practice of this invention. A list of such materials is provided in U.S. Pat. No. 3,442,008.

Fibers that are useful for an apparatus embodying the features of this invention have an external diameter which is generally less than one millimeter and preferably less than 0.6 millimeters, and which can even be between about 5 and about 100 microns. It is generally preferred that the outside diameter of the hollow fibers be between 200 to 300 microns. The outside diameter may be as large as 1,000 microns for certain fiber material such as silicone used in an oxygenator. Advantageously a wall thickness to outside diameter ratio of from about one-eighth to about one-third is employed in the hollow fibers. The wall thickness of the fibers is generally in the range of from about 1 micron to about 80 microns and preferably from about 2 to about 15 microns. Wall thicknesses below this range may result in an inability to withstand the desired pressures whereas thicknesses out of this range increases the resistance to mass transfer through the fiber wall. These characteristics vary with the particular material being used and the particular type of separation involved.

Preferred fibers for use on this invention, when the apparatus is used as an artificial kidney or a blood oxygenator, are made from regenerated cellulosic fibers softened with glycerin. Such materials are distributed under the tranename Cuprophan by Enka Glanzstoff A.G. locatedin Work Wuppertal-Barmen, West Germany. Fibers of diameters of about 200 to about 300 microns with wall thicknesses of about 11 micron are satisfactory when the apparatus is used for blood oxygenation or purification of blood as in an artificial kidney function.

As shown in FIGS. 1 and 2 the casing has a first and second fluid passage 44, 45 on the top side of the casing in communication with the interior 46 of the casing. The exterior wall of the passages 44 and 45 has the configuration of a Hansen fitting so that the separatory apparatus can be used with connections conventionally used with artificial kidneys. Fluid passage 44 is an inlet passage for the fluid exterior to the fibers, and the fluid passage 45 is an outlet or discharge passage for the same fluid. Although the fluid passages 44, 45 are shown on the same side of the casing, they may be on opposite sides of the casing.

Both the inlet passage 44 and the discharge passage 45 have a plenum 47 which acts as a circumferential distribution channel (FIGS. 2 and 4) along the inner wall 37 of the expanded casing end portions 38. The wall 48 of the thinner midsection 49 of the casing 20 extends into the expanded section 38 at each end of the casing into the region below the inlet and discharge passages 44, 45 thereby forming the plenums 47. The purpose of the plenums is to insure even distribution of the fluid on the exterior of the capillary tubing, thereby providing optimum mass transfer in the device.

The extreme end sections 51 of the casing are larger than even the expanded sections 38. The casing wall 52 in the expanded porion 38 of the casing extends into this area, thereby forming a slot 53 between an extension 54 of wall 52 and the outer wall 56 at the extreme ends of the casing. The purpose of this slot is to engage a conforming projection 57 of the casing header 22.

Figure 5:
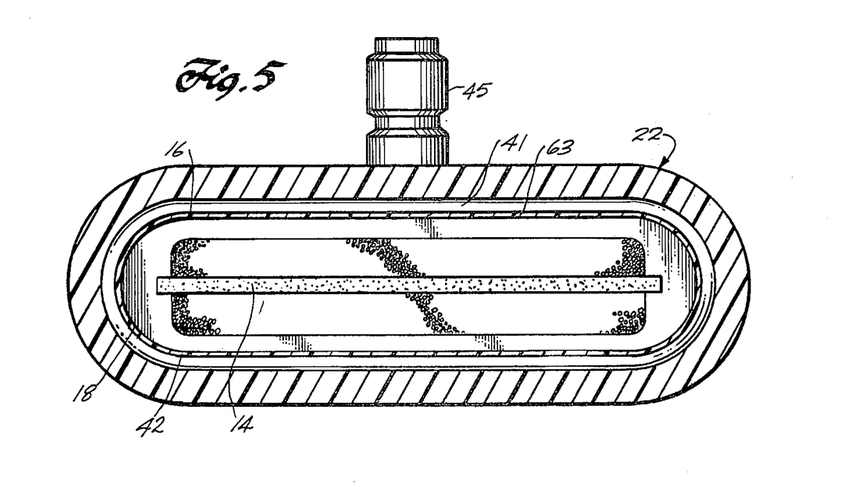
FIG. 5 is a cross-sectional view perpendicular to the longitudinal axis of the apparatus taken along lines 5—5 of FIG. 1.

As shown in FIGS. 2 and 5 the fibers 16 are surrounded at each end by a sealing collar 18 made of a potting compound which secures the fibers to the core extenders 14 and 15 and forms sealing flanges 19 at each end. Only the terminal portions of the fibers are impregnated with the potting compound and only in the region of the core extenders. Sufficient sealing compound is applied to completely cover the terminal portions of all the fibers.

The sealing compound necessarily must be made of an inert material, and in the case of biological applications, a non-toxic material. Also it must be of a material which will bond to both the fibers and the core extenders.

The material used for sealing collar 18 should have about the same density and the same rigidity as the material used for the core extenders 14 and 15 so that when the compound and the fibers 16 are cut to expose open ends of the fibers, the cutting tool does not wobble and therefore leave rough edges on the fibers.

This invention contemplates that the core extenders 14 and 15 and the sealing collars 18 be made from the same material. This gives identical density and rigidity to the sealing collar and the core extenders. Furthermore, the sealing collar should be made from a flexible material to give a good hermetic seal when used in conjunction with an O-ring 41. Therefore, when a polycarbonate core 12 is used it is preferred that a flexible be used to fabricate the sealing collar 18. A particularly satisfactory polyurethane is clear, thixotropic, extrudable material produced by B.J.B. Enterprises of Huntington Beach, California under the tradename T.C. 512-3. This material has a shore A hardness of from about 65 to about 70 at room temperature, an elongation of about 160%, and a tensile strength of about 750 psi after it has cured. The material is inert, bonds well to polycarbonate, and has sufficient flexibility to give a good hermetic seal in conjunction with the O-ring 41.

In assembling the apparatus the core 12 with the fibers 16 wound thereon is inserted in the casing 20 by engaging the edges 30 of the core in the slots 36 in the side of the casing 20. As shown in FIG. 7 a potting shell 77 is attached to one end of the casing 20 and the potting compound which forms the sealing collar 18 and sealing flange 19 is injected into the potting shell 77. The device is advantageously rotated to deaerate and pack the potting compound. After the potting compound of the sealing collar has cured, the process is repeated on the opposite end of the housing as shown in FIG. 7. Thereafter, the potting compound, fibers, and core extenders are cut along a cutting line representatively shown by the dotted lines 78 and 79 in FIG. 7. Thus, the single or few fibers that are wound on the core become a plurality of fibers with each fiber extending from one end of the core to the other with the ability of fluid flow therethrough.

As shown in FIGS. 2 and 5 an O-ring 41 is positioned between each header 22 and the casing 20. The combination of the O-ring 41 and flexible sealing flange 19 gives a hermetic seal at each end to prevent mixing of the fluids flowing on the outside of the fibers and the fluids flowing through the fibers.

Each header has a fluid passage 61, 62 through it, the fluid passage communicating with the fibers inside the casing. Each header has a projection 57 which is inserted into the slot 53 at the end of the casing. Radially inward from the outer projecton 57 which fits into the slot there is a smaller projection 63. The 0-ring 41 is seated between these inner and outer projections as shown in FIGS. 2 and 5. The header 22 presses the O-ring 41 against the sealing flange 19, thereby compressing the O-ring 41 and slightly deforming the sealing flange. However, since the sealing flange is made from a flexible material, the deformation is not permanent, and thus a good hermetic seal results. Furthermore, the amount of deformation of the sealing flange is limited by the wall extension 54 directly beneath the O-ring which provides support to the sealing flange 19. Thus, a permanent seal is obtained, unlike that obtained with other mass transfer devices which utilize a sealing flange made from a rigid material which permanently deforms.

The headers 22 are made from the same material as the casing, which preferably is polycarbonate.

The headers may be attached to the casing with solvent or adhesive. In the case of polycarbonate a suitable solvent is tetrahydrofuran. Sutiable adhesives for polycarbonate include the epoxy resins.

The preferred method of attaching the headers 22 to the casing 20 is by ultrasonic welding. Ultrasonic welding yields a quick secure bond. In addition, by using ultrasonic welding it is possible to compress the O-ring 41 at the same time as the headers 22 are attached to the casing 20.

Figure 8:
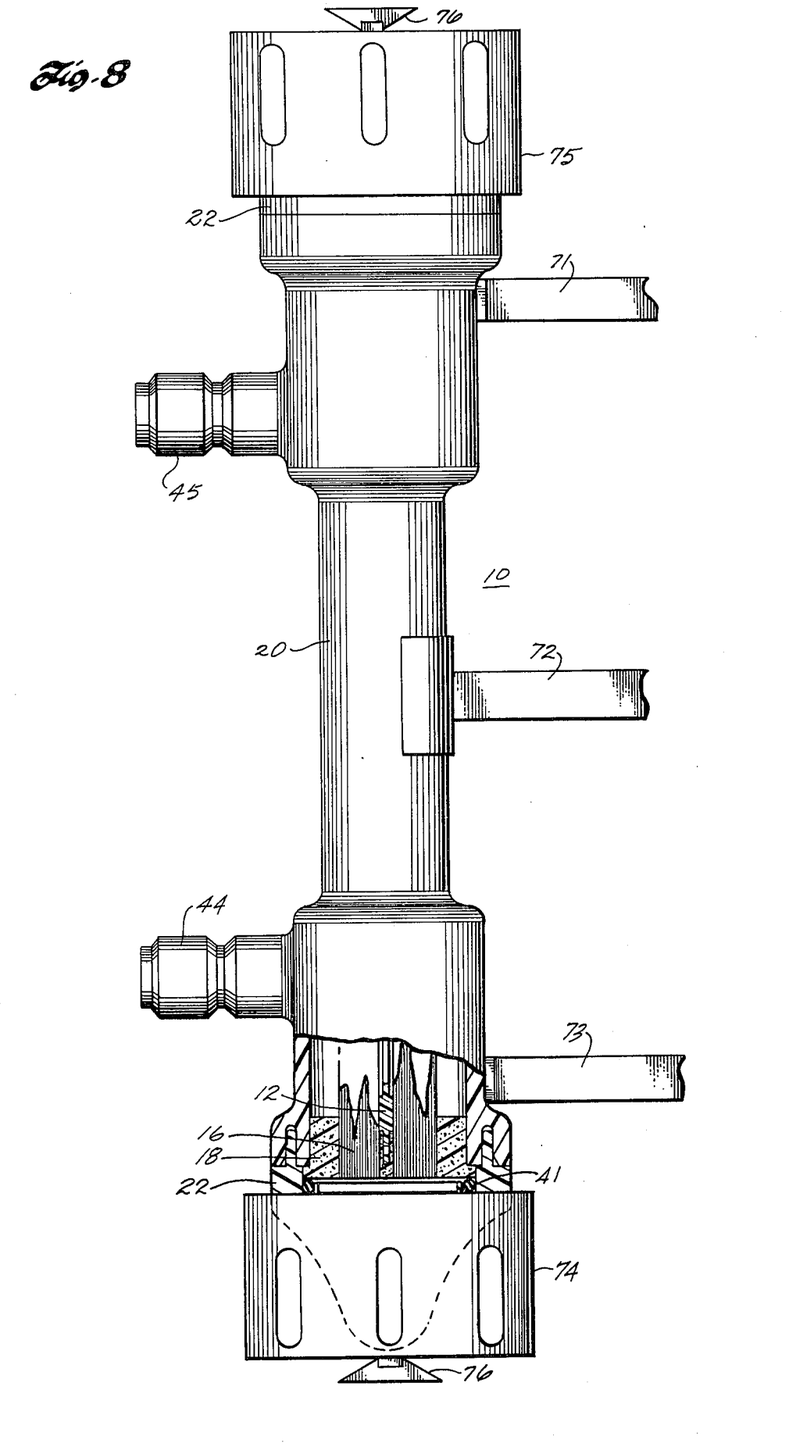
FIG. 8 is a side elevation view of an ultrasonic welding jig used during the assembly of the apparatus.

This invention contemplates ultrasonically welding both headers 22 onto the casing 20 at the same time. As shown in FIG. 8 the casing 20, with core 12, fibers 16, and sealing collar 18 therein, headers 22 and O-rings 41 are placed vertically in a welding jig 74. A second welding jig 75 is placed on the top header 22 with the O-ring 41 associated therewith in place. Guides 71, 72, and 73 contact and stabilize the housing prior to activation of the welder. Ultrasonic horns 76 are placed at both ends of the casing and activated. Upon activation of the horns, the guides 71, 72 and 73 move away from the housing. As the casing material and header material exposed to the ultrasonic vibrations melt and flow, compression on the O-rings at both ends increases. As the vibrations of the casing and headers ceases a sensor (not shown) deactivates the horns 76 and the welding action stops.

Thus, by using this method it is possible to quickly and inexpensively simultaneously weld both headers to the casing without the use of messy solvents and adhesives, while at the same time compressing the O-rings. Furthermore, a good hermetic seal with a predetermined amount of compression is obtained.

The assembled apparatus, as shown in FIGS. 1, 2 and 8 has four fluid passages, two on one side of the casing and one on each end of the casing. In operation, the fluid which flows external to the fibers enters through passage 44 on one side of the casing, flows through a plenum 47 distribution channel and then around the outside of the fibers 16, and out through the other flow passage 45 via its plenum distribution channel 47. The fluid flowing inside of th fibers enters through the flow passage 61 in the header at one end of the casing, flows through the open ends 42 of the fibers projecting through the sealing collar 18, (a few of which are shown oversized in FIG. 5), out through the fibers at their opposite end and then through the discharge flow passage 62 at the opposite end and then through the discharge flow passge 62 at the opposite end of the casing. Although counter-current flow results, either cocurrent or countercurrent flow may be used.

Figure 9:
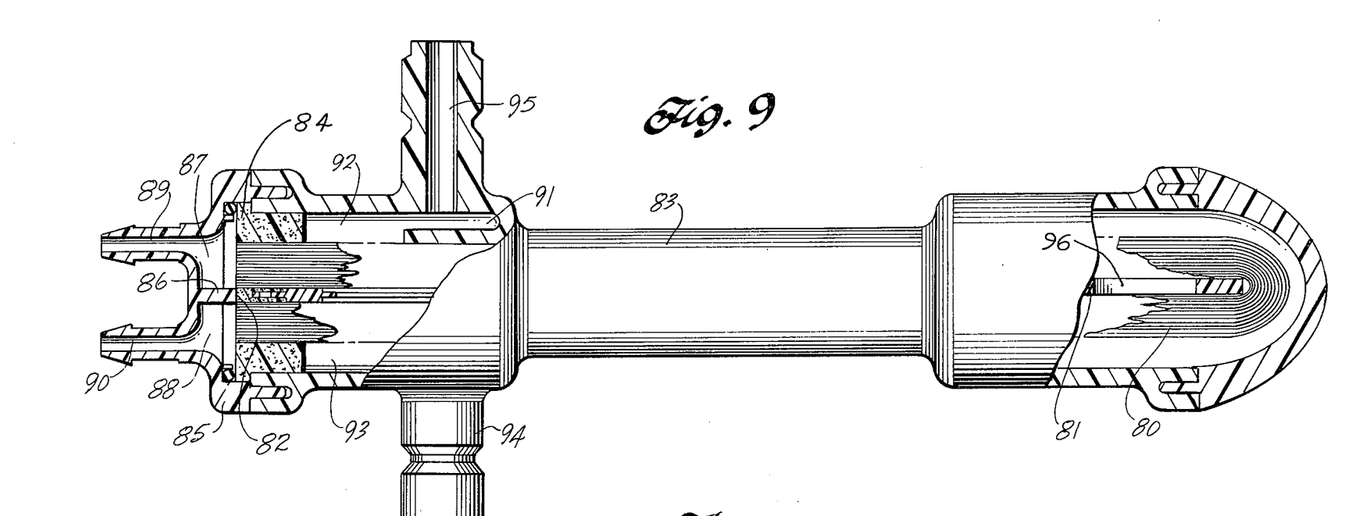
FIG. 9 is a side elevation view partially in cross-section along the center line of an alternative embodiment of the invention.

Although this apparatus has been shown with opposite terminal portions of the fibers, it is possible to produce a unit with U-shaped fibers 80 as shown in FIG. 9.

For this device a single strand or plural strands are wound around a core. A core extender 82 is attached to one end, since only one end needs to be cut to expose open ends of the fibers. Upon completion of the winding of the core it is placed inside the housing 83 with the ends of the core mating with slots (not shown) in the same way the core 12 mates with the slots 36 in the apparatus of FIGS. 1–8. Thereafter, potting compound is applied to the end to be cut to bond the fibers to the core and to form a sealing collar 84.

The end with the extender 82 is cut to expose the open ends of the fibers 80 and the end cap 85 is attached to the housing 83 by an adhesive or by ultrasonic welding to complete the unit.

Figure 10:
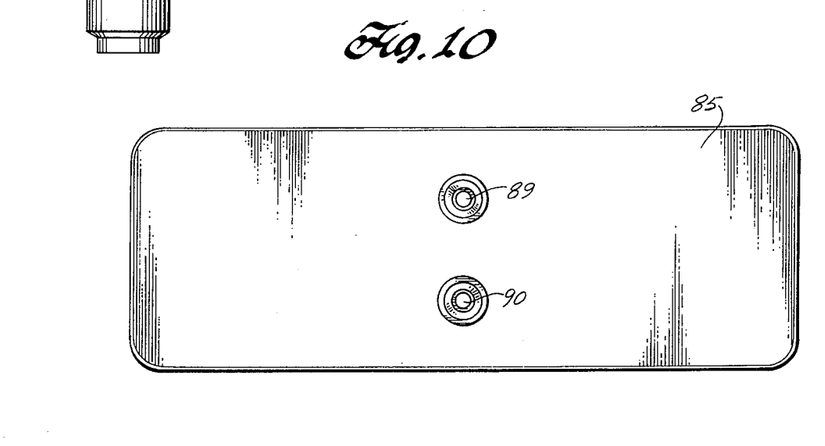
FIG. 10 is an end elevation view of a header or end cap for the alternative embodiment of FIG. 9.

End cap 85 has a partition 86 that mates with and cooperaties with the extender 82 to form two reservoirs 87 and 88, one above the extender 82 and one below the extender 82.

An inlet passage 89 communicates with the upper reservoir 87 and an outlet passage 90 communicates with the lower reservoir 88.

The walls of the housing 83 form a plenum 91 similar to the plenum 47 in the apparatus of FIGS. 1–8 except the plenum 91 has an upper and a lower section separated by a partition (not shown) in the plane of the core 81 that cooperates with the core 81 beyond the plenum area to separate the upper and lower parts of the housing. An upper reservoir 92 and a lower reservoir 93 is thus formed. An inlet passage 94 communicates with the lower reservoir 93 and an outlet passage 95 communicates with the upper reservoir 92.

In operation, fluid that flows external to the fibers enters passage 94 and flows along the bottom of the housing counter current to the fluid flowing in the fibers which enters passage 89 and exits passage 90. The external fluid flows around the end of the core 81 and thru U-shaped fibers 80 and then along the cap to exit passage 95. A hole 96 is provided in the core 81 to enhance the flow of the fluid externally around the fibers.

In the operation of a separatory apparatus embodying features of this invention, one or more components flowing inside of the tubing permeate, ultrafilterate, or by osmotic pressure flow to the outside of the tubing where they are absorbed by the fluid flowing external to the tubing. Similarly, components in the fluid on the outside of the tubing can flow into the tubing, for both operations can be conducted simultaneously. When the device is used as an artificial kidney, it is preferred that the blood flow within the tubing and the dialysate fluid flow external to the tubing. Similarly, when the device is used as an oxygenator it is preferred that the blood flows outside the tubing. In such an operation, oxygen selectively permeates through the fibers and is absorbed by the blood while carbon dioxide in the blood is released by the blood to flow through the tubing, and is picked up by the oxygen containing gas flowing outside the tubing.

An effective oxygenator also results when the core has several holes therethrough similar to the core 12 and the housing has an inlet and outlet passages on opposite sides similar to housing 83. The blood flows through the tubules and the oxygen flows external to the tubules.

Besides use as an artficial kidney or blood oxygenator, a separatory apparatus having features of this invention has many other uses. Among these alternate uses are those listed in U.S. Pat. No. 3,228,876 beginning at column 15 and U.S. Pat. No. 3,422,008 beginning at column 16, line 17.

While certain features of this invention have been described in detail with respect to various embodiments thereof, it will of course be apparent that other modifications can be made within the spirit and scope of this invention, and thus the appended claims should not be necessarily limited to the description of the preferred embodiment.

What is claimed is:

1. A separatory apparatus comprising a supporting core, at least one layer of selectively permeable continuously hollow fibers positioned on the supporting core, core extenders attached to the core where the fibers terminate, and potting compound attaching at least the terminal portions of the fibers to the core extenders, the core extenders being fabricated from a material with about the same rigidity and about the same density as the potting compound.

2. The separatory apparatus claimed in claim 1 wherein the core is thin and has a smooth rectangular surface on the top and bottom sides.

3. The separatory apparatus of claim 2 wherein the core is perforated.

4. The separatory apparatus as claimed in claim 1 wherein the core is made from polycarbonate.

5. The separatory apparatus as claimed in claim 1 wherein the core extenders are made from flexible polyurethane.

6. The separatory apparatus as claimed in claim 5 wherein the potting compound is flexible polyurethane.

7. A separatory apparatus comprising:
a flat, thin rectangular core;
a first flexible core extender permanently attached to one end of the core thereby lengthening said end of the core;
a second flexible core extender permanently attached to the opposite end of the core, thereby lengthening said end of the core;
at least one layer of aligned, contiguous, selectively permeable, continuously hollow fibers extending between the core extenders on both side of the core, wherein the fibers have open opposite terminal portions;
flexible sealing collars wherein the collars permanently bond the terminal portions of the fibers to the core extenders, the open terminal portions of the fibers extend through the collars; the core extender being made form a material having about the same rigidity and about the same density as the material from which the sealing collars are made;
a casing with open opposite ends enclosing and supporting the core, core extenders, and fibers;
a first header attached to and supported by the casing at one open end of the casing;
a second header attached to and supported by the casing at the open end of the casing opposite the first header;
a first fluid passage in communication with the first header and the fibers;
a second fluid passage in communication with the second header and the fibers;
a third fluid passage positioned on a side of the casing; a fourth fluid passage positioned on a side of the casing; and
means for sealing fluid flowing in the first and second fluid passages from fluid flowing in the third and fourth passages.

8. An apparatus as claimed in claim 7 wherein the interior of the casing conforms to the approximate size and outer configuration of the core, core extenders, and fibers positioned thereon.

9. An apparatus as claimed in claim 7 wherein the interior of the casing has a slot at each side into which the sides of the core fit.

10. An apparatus as claimed in claim 7 wherein there is a circumferential flow distribution channel along the interior wall of the casing beneath at least one of the fluid passages positioned on the side of the casing.

11. An apparatus as claimed in claim 7 wherein the means for sealing comprises in combination a portion of the sealing collar that extends beyond the end of the casing and is enlarged to form a flange beyond the end of the casing, a support projection at the end of the casing behind the flange, an interior wall of the header and a flexible O-ring positoned between the interior wall of the header and the flange above the support projection of the casing.

12. A separatory apparatus as claimed in claim 7 wherein the core has a plurality of perforations.

13. An apparatus as claimed in claim 7 wherein the core is made of polycarbonate.

14. A separatory apparatus comprising:
a flat, thin, core;
a core extender permanently attached to one end of the core, thereby lengthening the core;
at least one layer of aligned, contiguous, selectively permeable, continuously hollow fibers positioned along both sides of the core and core extender, wherein the fibers substantially cover the core and core extender, wherein one terminal portion of each fiber is bonded to one side of the core extender and the other terminal portion of each fiber is bonded to the opposite side of the core extender;
a flexible sealing ring which permanently bonds the terminal portions of the fibers to the core extender, wherein the open terminal portions of the fibers extend through the sealing ring;
a casing with at least one open end, enclosing and supporting the core, the core extender, and the fibers;
a header attached to and supported by the casing at the open end of the casing;
a first fluid passage through the header in communication with the open terminal portions of the fibers bonded to one side of the core extender;
a second fluid passage through the header in communication with the open terminal portion of the fibers bonded to the opposite side of the core extender;
a third fluid passage positioned on a side of the casing; a fourth fluid passage positioned on a side of the casing;
means for sealing fluid flowing in the first and second fluid passages from fluid flowing in the third and fourth passages; and
means for sealing fluid flowing into the open terminal portions of the fibers on one side of the core extender from the fluid flowing out of the open terminal portion of the fibers on the opposite side of the core extender.

15. A separatory apparatus comprising:
a flat, thin, smooth surfaced, polycarbonate core having a rectangular cross-section;
a plurality of perforations through the core;
a first core extender made from a flexible polyurethane material permanently attached to one end of the core wherein the first core extender lengthens said end;
a second core extender made from the flexible polyurethane material permanently attached to the opposite end of the core thereby lengthening said end;
at least one layer of aligned, contiguous, selectively permeable continuously hollow fibers extending between the core extenders and positioned along both sides of the core and core extenders, wherein the fibers substantially cover the core and the core extenders, and the fibers have open opposite terminal portions;
sealing collars formed from the flexible polyurethane compound wherein the collar permanently bonds the terminal portions of the fibers to the core extenders, and wherein the open terminal portions of the fibers extend through the collars;
a casing with open opposite ends, the interior of said casing conforming to the approximate size and outer configuration of the core, core extenders, and fibers; said casing supporting said core, core extenders, and fibers;
a pair of slots in the interior of the casing into which the core fits;
a first header attached to and supported by the casing at one open end of the casing;
a second header attached to and supported by the casing at the open end of the casing opposite the first header;
a first fluid passage in communication with the first header and the fibers;
a second fluid passage in communication with the second header and the fibers;
a third passage positioned on a side of the casing;
a fourth fluid passage positioned on a side of the casing;
a circumferential flow distribution channel along the interior wall of the casing beneath at least one of the fluid passages positioned on the side of the casing; and
means for sealing fluid flowing in the first and second fluid passages from fluid flowing in the third and fourth passages comprising a flexible O-ring positioned between the end of the sealing collar above a support projection of the casing and the header at each end of the apparatus.

16. In a separatory device having a hollow fiber membrane and a housing where, in use, a first fluid flows inside the membrane and a second fluid flows in a portion of the housing in contact with the outside of the membrane, the improvement comprising:
a thin card-shaped supporting core having a rigid section and a core extender at least at one end of the rigid section, the fibers extending over the core extender;
at least one layer of selectively permeable continuously hollow fibers positioned on the supporting core as the membrane; and
a potting compound sealing collar at least at one end of the core binding the fibers together and attaching the bound fibers to the core.

17. The separatory device claimed in clam 16 wherein the core extender is fabricated from a material with about the same hardness and about the same density as the potting compound.

18. The separatory device claimed in claim 16 wherein the core extender is permanently attached to the rigid section.

19. The separatory device claimed in claim 16 wherein the rigid section is perforated.

20. The separatory device claimed in claim 16 wherein the rigid section of the core is made from polycarbonate.

21. The separatory device claimed in claim 16 wherein the core extender is made from flexible polyurethane.

22. The separatory device claimed in claim 21 wherein the potting compound is flexible polyurethane. wher 23. In a separatory device having a hollow fiber membrane and a housing where, in use, a first fluid flows inside the membrane and a second fluid flows in a portion of the housing in contact with the outside of the membrane, the improvement comprising:
- a thin card-shaped supporting core;
- at least one layer of selectively permeable continuously hollow fibers positioned on the supporting core as the membrane;
- each layer of fibers comprising a plurality of parallel strands having a selected spacing relative to adjacent strands and a selected angle relative to the sides of the core; and
- a potting compound sealing collar at least at one end of the core binding the fibers together and attaching the bound fibers to the core.

24. The separatory device claimed in claim 23 wherein the fibers have an angle between 0° and 30° relative to the long sides of the core.

25. The separatory device claimed in claim 24 wherein the angle of the fibers is 5°.

26. The separatory device claimed in claim 23 wherein the fibers of each layer have an angle that is reverse to the angle of the fibers in each contiguous layer to form a criss-cross configuration.

27. In a separatory device having a hollow fiber membrane and a housing where, in use, a first fluid flows inside the membrane and a second fluid flows in a portion of the housing in contact with the outside of the membrane, the improvement comprising:
- a thin card-shaped supporting core;
- at least one layer of selectively permeable continuously hollow fibers positioned on the supporting core as the membrane;
- the housing having at least one fluid inlet passage positioned on a side;
- a circumferential flow distribution channel along the interior wall of the housing beneath at least one of the fluid inlet passages on the side of the housing; and
- a potting compound sealing collar at least at one end of the core binding the fibers together and attaching the bound fibers to the core.

28. In a separatory device having a hollow fiber membrane and a housing where, in use, a first fluid flows inside the membrane and a second fluid flows in a portion of the housing in contact with the outside of the membrane, the improvement comprising:
- a thin card-shaped supporting core;
- at least one layer of selectively permeable continuously hollow fibers positioned on the supporting core as the membrane;
- a potting compound sealing collar at least at one end of the core binding the fibers together and attaching the bound fibers to the core;
- the housing comprising a casing with open opposite ends enclosing and supporting the core and fibers, a first header attached to and supported by the casing at one open end of the casing, and second header attached to and supported by the casing at the open end of the casing opposite the first header;
- a first fluid passage in communication with the first header and the fibers;
- a second fluid passage in communication with the second header and the fibers;
- each sealing collar extending beyond the end of the casing and having an enlarged flange beyond the end of the casing; and
- a flexible O-ring compressed between an interior wall of the header and the flange above a support projection of the casing to form a hermetic seal.

29. The separatory device claimed in claim 28 wherein the headers are welded to the casing and the O-ring is compressed when the headers are ultrasonically welded to the casing.

30. In a separatory device having a hollow fiber membrane and a housing where, in use, a first fluid flows inside the membrane and a second fluid flows in a portion of the housing in contact with the outside of the membrane, the improvement comprising:
- a thin card-shaped supporting core;
- at least one layer of selectively permeable continuously hollow fibers positioned on the supporting core as the membrane;
- a potting compound sealing collar at least at one end of the core binding the fibers together and attaching the bound fibers to the core;
- opposing slots in the interior wall of the housing to accommodate the longitudinal edges of the core; and
- the core being positioned with the longitudinal edges thereof in the slots.

31. In a separatory device having a hollow fiber membrane and a housing where, in use, a first fluid flows inside the membrane and a second fluid flows in a portion of the housing in contact with the outside of the membrane, the improvement comprising:
- a thin card-shaped supporting core;
- at least one layer of selectively permeable continuously hollow fibers positioned on the supporting core as the membrane; and
- a potting compound sealing collar at each end of the core binding the fibers together and attaching the bound fibers to the core and forming with the housing a reservoir at each end of the housing beyond the collars and a reservoir between the collars.

* * * * *

UNITED STATES PATENT AND TRADEMARK OFFICE
CERTIFICATE OF CORRECTION

PATENT NO. : 4,031,012

DATED : June 21, 1977

INVENTOR(S) : Paul W. Gics

It is certified that error appears in the above-identified patent and that said Letters Patent are hereby corrected as shown below:

Column 1, line 12, "3,961,068" should read --3,691,068--; line 15, "capillay" should read --capillary--. Column 3, line 59, "buld" should read --bulk--. Column 5, line 53, "3,442,008" should read --3,422,008--. Column 6, line 11, "tranename" should read --tradename--; line 44, "porion" should read --portion--. Column 7, line 8, after "flexible" insert --polyurethane--; line 67, "Sutiable" should read --Suitable--. Column 8, lines 44-45, delete "and then through the discharge flow passge 62 at the opposite end"; line 68, "cooperaties" should read --cooperates--. Column 9, line 37, "outside" should read --inside--; after "tubing" and before the period, insert --and the oxygen containing gas flows outside the tubing--. Column 10, line 26, "side" should read --sides--; line 33, "form" should read --from--. Column 12, line 20, after "third" insert --fluid--; line 48, "clam" should read --claim--; line 65, delete "wher".

Signed and Sealed this

Nineteenth Day of September 1978

[SEAL]

Attest:

RUTH C. MASON
*Attesting Officer*

DONALD W. BANNER
*Commissioner of Patents and Trademarks*